United States Patent [19]

Schieferstein et al.

[11] Patent Number: 5,358,988
[45] Date of Patent: Oct. 25, 1994

[54] WATER-IN-OIL EMULSIONS

[75] Inventors: Ludwig Schieferstein, Ratingen; Herbert Fischer, Duesseldorf; Hermann Kroke, Mettmann; Brigitte Spei, Duesseldorf; Volker Wehle, Haan; Rainer Jeschke, Duesseldorf; Uwe Ploog, Haan, all of Fed. Rep. of Germany

[73] Assignee: Henkel Kommanditgesellschaft auf Aktien, Duesseldorf, Fed. Rep. of Germany

[21] Appl. No.: 50,457

[22] PCT Filed: Nov. 5, 1991

[86] PCT No.: PCT/EP91/02081

§ 371 Date: Jul. 14, 1993

§ 102(e) Date: Jul. 14, 1993

[87] PCT Pub. No.: WO92/08744

PCT Pub. Date: May 29, 1992

[30] Foreign Application Priority Data

Nov. 14, 1990 [DE] Fed. Rep. of Germany ....... 4036207
Apr. 8, 1991 [DE] Fed. Rep. of Germany ....... 4111334

[51] Int. Cl.$^5$ .............................................. C08K 5/10
[52] U.S. Cl. ........................... 524/280; 524/312; 524/314; 524/315; 524/318; 524/378; 524/755; 524/757
[58] Field of Search ............. 524/378, 755, 757, 314, 524/315, 312, 318, 280

[56] References Cited

U.S. PATENT DOCUMENTS

| | | | |
|---|---|---|---|
| 3,624,019 | 11/1971 | Anderson et al. | 260/29.6 |
| 4,581,402 | 4/1986 | Dunk et al. | 524/755 X |
| 4,792,582 | 12/1988 | Hoefer et al. | 524/378 |
| 4,950,709 | 8/1990 | Schlueter et al. | 524/757 X |
| 4,981,893 | 1/1991 | Hoefer et al. | 524/755 X |
| 5,093,411 | 3/1992 | Buter | 524/755 X |

FOREIGN PATENT DOCUMENTS

| | | |
|---|---|---|
| 0068955 | 1/1983 | European Pat. Off. . |
| 0208217 | 1/1987 | European Pat. Off. . |
| 1081288 | 2/1958 | Fed. Rep. of Germany . |
| 1089173 | 3/1958 | Fed. Rep. of Germany . |
| 2154081 | 10/1971 | Fed. Rep. of Germany . |
| 2412266 | 3/1974 | Fed. Rep. of Germany . |
| 2446584 | 9/1974 | Fed. Rep. of Germany . |
| 2537586 | 8/1975 | Fed. Rep. of Germany . |
| 2538281 | 8/1975 | Fed. Rep. of Germany . |
| 2840894 | 9/1978 | Fed. Rep. of Germany . |
| 2924663 | 6/1979 | Fed. Rep. of Germany . |
| 3224994 | 7/1982 | Fed. Rep. of Germany . |
| 3302069 | 1/1983 | Fed. Rep. of Germany . |
| 3522419 | 6/1985 | Fed. Rep. of Germany . |

OTHER PUBLICATIONS

Industrial Solvents Handbook, 3rd Edition, Noyes Data Corp, N.J. 1985, p. 381 (Article Unavailable).
D'Ans-Lax, Taschenbuch für Chemiker und Physiker, 2nd vol. Organische Verbindungen, 4th Edition, Springer Verlag (1983) Article Unavailable).
Ullmann's Encyklopädie der technischen Chemie, 4th Edication (1977), vol. 14, Verlag Chemie, Weinheim, pp 591–593.
J. T. Davies (das Atlas-HLB-System, Atlas Chemie GmbH, EC10G Jul. 1971; HLB-System, Römpps Chemie-Lexikon, 8th Ed., p. 1715, Frankh'sche Verlagshandlung Stuttgart.
J. Reuter (Chemikier-Zeitung, vol. 98 (1974), No. 5, pp. 222–227).

Primary Examiner—Judy M. Reddick
Attorney, Agent, or Firm—Ernest G. Szoke; Wayne C. Jaeschke; Norvell E. Wisdom, Jr.

[57] ABSTRACT

Described are water-in-oil emulsions containing an emulsion polymerizate which is soluble in or swells in water and an oil phase, consisting at least partly of monoether compounds, that is not miscible with water in all proportions. Also described are a method of preparing such emulsions and their use as agents for precipitation, sedimentation, and/or thickening.

20 Claims, No Drawings

WATER-IN-OIL EMULSIONS

FIELD OF THE INVENTION

This invention relates to water-in-oil emulsions containing an emulsion polymer soluble or swellable in water in an oil phase of limited miscibility with water, to a process for their production and to the use of the inverted emulsions as flocculants, sedimenting agents and/or as thickeners.

STATEMENT OF THE RELATED ART

Water-in-oil emulsions, above all with homopolymers and/or copolymers of acrylamide as emulsion polymer, have acquired a broad range of applications as high-solids liquid products of handlable viscosity by virtue of the invertibility of the emulsions and the possible production of aqueous polymer solutions. Particular significance is attributed to inverted emulsions such as these as flocculants and/or as thickeners in the treatment of communal and industrial wastewaters, where they bring about extensive separation of the solid phase from the liquid phase. Processes for the production of water-in-oil emulsions of high molecular weight compounds by polymerization of ethylenically unsaturated monomers dissolved in water in an oil phase are well known. The oil phase generally consists of inert hydrophobic liquids of the aromatic and/or chlorinated hydrocarbon type, such as mineral oil, kerosines, naphthas, toluene, xylene, o-dichlorobenzene, propylene dichloride and the like (cf. DE-A-10 89 173, DE-A-10 81 228, DE-C-21 54 081). The use of such emulsions as flocculants, for example in sewage treatment plants, involves increasing environmental risks insofar as the oil remains in the sludge to be disposed of. DE-A-33 02 069 describes preparations suitable as flocculants, in which the oil phase may optionally contain natural triglycerides and/or fatty acid monoesters in addition to the aromatic and/or halogenated hydrocarbons already described. EP 208 217 describes corresponding emulsions in which the oil phase contains up to 100% by weight, based on oil phase, of aliphatic dicarboxylic acid esters as ecologically safe flocculants. However, applicants' own investigations have shown that, above all, high percentage contents of acid esters in the oil phase can seriously disturb polymerization of the ethylenically unsaturated monomers so that the dispersions obtained become more unstable or the emulsion polymers obtained have comparatively lower molecular weights than usual. However, water-in-oil emulsions of which the polymers have high molecular weights and which therefore show greater effectiveness are preferred for practical applications.

DESCRIPTION OF THE INVENTION

Object of the Invention

Accordingly, the problem addressed by the present invention was to provide polymer-containing water-in-oil emulsions in which the polymers would have high molecular weights and in which the oil phase would be more readily biodegradable than the oil phases hitherto used.

Summary of the Invention

The present invention relates to water-in-oil emulsions of emulsion polymers dissolved in water and/or swellable in water in a liquid oil phase of limited miscibility with water in the presence of water-in-oil emulsifiers, characterized in that the oil phase at least partly contains monoether compounds, the monoether compounds having two identical or different hydrocarbon moieties with at least 5 C atoms linked by the ether oxygen.

DESCRIPTION OF PREFERRED EMBODIMENTS

In the context of the present invention, the expression "oil phase" is used simplistically for hydrophobic compounds or mixtures of various hydrophobic compounds which are present in the emulsion as a liquid phase. In principle, the oil phase has to meet certain requirements. Thus, the miscibility of the oil phase in water should be limited to such an extent that the oil phase forms a clear two-phase system with water. Accordingly, the oil phase of the emulsions according to the invention contains only small dissolved quantities of water, preferably below 0.3% by weight and more preferably below 0.1% by weight, as determined at 20° C. and based on oil phase. In addition, the oil phase should be present in liquid form at least at room temperature (20° C. to 25° C.) and should change into the solid state only below 0° C. and should have its boiling point above the polymerization temperature of the monomers to be polymerized. Monoether compounds which satisfy these rheological and water-solubility requirements can be found by the expert in any relevant handbooks, cf. for example *Industrial Solvents Handbook*, 3rd Edition (Noyes Data Corporation, New Jersey, 1985) page 381; D'Ans-Lax, *Taschenbuch für Chemiker und Physiker*[English title: Pocket Book for Chemists and Physicists], 2nd Vol. *Organische Verbindungen* [English title: Organic Compounds], 4th Edition, (Springer Verlag, 1983). According to the invention, the oil phase at least partly contains monoether compounds, two identical or different hydrocarbon moieties being linked by the ether oxygen and these hydrocarbon moieties containing at least 5 carbon atoms. This lower limit to the necessary carbon atoms for the hydrocarbon moiety of the monoether compounds was determined in tests conducted by applicants themselves. Thus, it was found in emulsion polymerization experiments that gelation occurs in the presence of monoether compounds containing 4 carbon atoms or less per hydrocarbon moiety. Monoether compounds containing identical or different aliphatic, cyclic and/or aromatic hydrocarbon moieties containing 5 to 24 carbon atoms and preferably up to 18 carbon atoms, the hydrocarbon moieties optionally beating an inert substituent, are preferred. It should be noted in this regard that the upper limit to the carbon atoms of the hydrocarbon moieties and the preferred ranges are only approximate values because the melting and boiling points can vary considerably according to the character of the hydrocarbon moiety (theological requirements). Monoether compounds containing identical or different aliphatic, branched or unbranched hydrocarbon moieties having 6 to 14 and preferably 7 to 12 carbon atoms are preferred for reasons of biodegradability. It is important in this regard to bear in mind that monoether compounds containing aliphatic, branched hydrocarbon moieties have a lower solidification point, but also a lower boiling point than unbranched aliphatic hydrocarbon moieties. Aliphatic unbranched hydrocarbon moieties containing 8 to 10 carbon atoms are most particularly preferred. Examples of this group of monoether compounds are di-n-octyl ether, n-octyl-n-nonyl ether, di-n-decyl ether, di-n-nonyl ether and mixtures thereof. Of these monoether compounds, those of which the identical or different hydrocarbon moieties have an even number of carbon atoms are particularly preferred.

In the case of mixtures of monoether compounds, it is advisable in the interests of biodegradability and theology to use monoether compounds containing aliphatic unbranched hydrocarbon moieties having 6 to 14, preferably 7 to 12, and more preferably 8 to 10 carbon atoms in quantities of more than 30% by weight and preferably in quantities of more than 50 to 100% by weight, based on the ether compounds of the oil phase.

The emulsions according to the invention at least partly contain monoether compounds in the oil phase, their hydrocarbon moieties linked by the ether oxygen containing at least 5 carbon atoms. These special monoether compounds are preferably present in quantities of more than 10% by weight, more preferably in quantities of 30 to 100% by weight and most preferably in quantities above 45% by weight, based on oil phase. Other constituents of the oil phase are hydrophobic compounds which are miscible with or soluble in the special monoether compounds in any ratio and which in admixture, satisfy the basic requirements which the oil phase is expected to meet. Preferred hydrophobic compounds are those from the group of carbonic acid diesters, fats, oils, fatty acid monoesters, such as isohexadecyl stearate and isotridecyl stearate, dicarboxylic acid esters and/or hydrocarbons, such as toluene, perchloroethylene and the like, which are all together known to the expert as oil phase from the prior art (cf. DE-B-10 89 173, DE-A-21 54 081 and EP-C-208 217) and which are miscible with or soluble in the special monoether compounds in any ratio. Of the carbonic acid diesters, those of lower aliphatic alcohols containing 1 to 22 carbon atoms are preferably used as the hydrophobic compound. Carbonic acid diesters are commercially available products and may be prepared by the methods described in *Ullmann's Encyklopädie der technischen Chemie* [English title: Ullmann's Encyclopedia of Technical Chemistry], 4th Edition, Vol. 14 (Verlag Chemie, Weinheim, 1987), pages 591–593. From the point of view of biodegradability, fats, oils, fatty acid monoesters, carbonic acid diesters and/or dicarboxylic acid esters are most particularly suitable as further hydrophobic constituents of the oil phase. The hydrophobic compounds may be present in quantities of 0 to 90% by weight, preferably in quantities of up to 70% by weight and, more particularly, in quantities up to 55% by weight, based on oil phase. If fatty acid monoesters are to be present as the hydrophobic compounds in the oil phase, it is important in this case to ensure that they are only present in quantities of up to 50% by weight and preferably up to 20% by weight, based on oil phase, in addition to the monoether compounds and optionally other hydrophobic compounds. If carbonic acid diesters are to be present as the hydrophobic compounds in the oil phase, it is important in their case to ensure that they are only present in quantities of up to 75% by weight and preferably up to 50% by weight, based on the oil phase. In some cases, the oil phase may also contain monoether compounds which, on their own, do not satisfy the requirements relating to solubility in water, solidification point and boiling point. In these cases, however, the monoether compounds of that kind must satisfy the requirements relating to the oil phase in admixture with the monoether compounds preferably used in accordance with the invention and, optionally, the other hydrophobic compounds.

The water-in-oil emulsions according to the invention contain emulsion polymers soluble in water or swellable in water. In the context of the invention, emulsion polymers are understood to be homopolymers or copolymers which are prepared by polymerization of ethylenically unsaturated monomers in emulsion, the monomers being at least partly soluble in water and the aqueous phase being dispersed in the oil phase described above. Monomers which are soluble at least in quantities above 10% by weight, based on aqueous phase, are preferred. Suitable ethylenically unsaturated monomers for the homopolymers or copolymers of the emulsions according to the invention are generally known in the prior art and are described in numerous publications and patent specifications and in the patents and patent applications cited as prior art, for example in DE-B-25 37 586, DE-A-28 40 894, DE-A-25 38 281, DE-A-29 24 663 and DE-A-24 46 584. The ethylenically unsaturated monomers have at least one double bond, but may also contain two double bonds and may optionally have functional groups, such as acid groups, in free form and/or in the form of their salts or aminocarboxylic acid groups. Special examples of suitable monomers are methacrylamide and acrylamide (hereinafter also referred to in brief as (meth)acrylamide), acrylic acid and methacrylic acid (hereinafter also referred to in brief as (meth)acrylic acid], alkali and/or ammonium salts of (meth)acrylic acid, N-substituted amides of (meth)acrylamide, such as methyl (meth)acrylamide and/or methylene-bis-(meth)acrylamide, (meth)acrylamidoalkane sulfonic acids and/or sails thereof, such as 2-acrylamido-2-methyl propane sulfonic acid, (meth)acrylates of aminoalcohols, such as dimethylaminoethyl (meth)acrylate in neutralized form and/or in quaternized form, hydroxyalkyl (meth)acrylates, such as ethylene glycol mono(meth)acrylate and/or ethylene glycol di(meth)acrylate and/or oligoethylene glycol di(meth)acrylate. Ethylenically unsaturated monomers containing one double bond are preferred. Unsaturated monomers containing one and/or more double bonds, which do not belong to the (meth)acrylate series and which optionally are only slightly soluble in water, such as maleic acid and/or anhydride, vinyl acetate, vinyl sulfonic acid and/or salts thereof, acrylonitrile, vinyl pyridines, vinyl ethers, allyl amines, vinyl pyrrolidone, divinyl benzene and/or styrene, may also be used as comonomers in quantities in which, together with the water-soluble monomers, they lead to emulsion polymers soluble in water or swellable in water. The hydrophobicity of the emulsion polymers obtained can be adjusted through the percentage content of monomers which show only limited solubility in water. Provided that the emulsion polymers obtained are soluble in water or swellable in water, the percentage content of hydrophobic monomers in the monomer mixture may vary within wide limits, according to the hydrophobicity of the particular monomer and the desired degree of hydrophobicization of the emulsion polymers. Monomers which have a double bond and which are soluble in water are most particularly preferred. Of the emulsion polymers listed in the foregoing, homopolymers or copolymers of—based on the total monomer content— a) 0 to 100% by weight of (meth)acrylamide b) 0 to 100% by weight of ethylenically unsaturated monomers containing an acid group in free form and/or in the form of its salts c) 0 to 100% by weight of ethylenically unsaturated monomers containing an amine group and/or ammonium group, the sum of the monomers having to be 100% by weight, in the form of emulsions are preferred for use as flocculants and/or sedimentation aids. Homopolymers of a) to c) and copolymers of a) and b) or of a) and c) are particularly preferred, with the proviso that the sum of the monomers must be 100% by weight.

Copolymers of monomers belonging to groups a) and b) are also referred to hereinafter as anionically modified poly(meth)acrylamides while copolymers of monomers belonging to groups a) and c) are referred to as cationically modified poly(meth)acrylamides. Particularly suitable monomers of group b) are (meth)acrylic acid, alkali metal and/or ammonium salts of (meth)acrylic acid and/or (meth)acrylamidoalkane sulfonic acids and/or salts thereof. Particularly suitable monomers of group c) are N-substituted amides of (meth)acrylamide and/or (meth)acrylates of aminoalcohols in neutralized and/or in quaternized form.

In another embodiment of the present invention, the emulsion polymers may contain up to 50% by weight, based on the total monomer content, of monomers bearing nonionic functional groups in copolymerized form, provided that monomers of groups b) or c) are copolymerized in the emulsion polymers. Among the monomers bearing nonionic functional groups, preferred monomers are vinyl acetate, vinyl alcohol, hydroxyalkyl (meth)acrylates, such as ethylene glycol (meth)acrylate, and/or oligoethylene glycol di(meth)acrylate.

Cationically and/or anionically modified poly(meth)acrylamides containing (meth)acrylamide in copolymerized form in quantities of 20 to 85% by weight, based on the total monomer content, are most particularly preferred emulsion polymers for use as flocculants and/or sedimentation aids.

In addition, emulsion polymers containing 99.99 to 95% by weight of a cationically modified polyacrylamide and 0.01 to 5% by weight of an anionically modified polyacrylamide or 99.99 to 95% by weight of an anionically modified polyacrylamide and 0.01 to 5% by weight of a cationically modified polyacrylamide, based on the total quantity of polymer, may also be used for the purposes of the invention in accordance with DE-A-25 38 281.

From the group of already generally described emulsion polymers, homopolymers and copolymers of (meth)acrylamide and/or (meth)acrylic acid, which may optionally contain up to 50% by weight—based on total monomer content—of the monomers of group b), c), and/or monomers bearing nonionic functional groups in copolymerized form are preferred for use as thickeners. Copolymers of (meth)acrylic acid and acrylamide are preferably used as thickeners in the form of emulsions.

The water-in-oil emulsions according to the invention contain emulsion polymers soluble in water or swellable in water in large quantities, preferably in quantities of 20 to 60% by weight and more preferably in quantities of 30 to 50% by weight, based on emulsion. In order to reach these quantities of emulsion polymer in the aqueous phase, the quantities of monomers familiar to the expert have to be used. If desired, the expert may also concentrate the emulsion by the processes mentioned, for example, in DE-A-32 24 994 or DE-A-35 22 419 in order to obtain large quantities of emulsion polymers. High molecular weight emulsion polymers having a molecular weight in the range from 50,000 to 25,000,000, preferably in the range from 500,000 to 10,000,000, and more preferably in the range from 1,000,000 to 5,000,000 are preferred for the purposes of the invention. The emulsion polymers according to the invention are preferably present in the aqueous phase in finely divided form and have a particle size of 50 $\mu$m to 1 $\mu$m.

Dispersants or emulsifiers of the water-in-oil type are used to disperse the aqueous monomer solution in the continuous oil phase and to stabilize the water-in-oil emulsion according to the invention. According to J. T. Davies (das Atlas-HLB-System (English title: The Atlas HLB System), (Atlas Chemie GmbH, EC10G, July 1971); HLB-System, Rompps Chemie-Lexikon (English title: HLB-System, Römpps's Chemical Dictionary), 8th Edition (Frankh'sche Verlagshandlung, Stuttgart), page 1715, suitable water-in-oil emulsifiers have an HLB value of 1 to 10 and preferably 2 to 8. Examples of polymeric emulsifiers can be found in DE-C-24 12 266 while examples of lipophilic emulsifiers can be found in U.S. Pat. No. 3,624,019. Preferred emulsifiers are hexadecyl sodium phthalate, sorbitan monostearate, cetyl stearyl sodium phthalate, mixtures of oleic acid monoglyceride and oleic acid diglyceride containing 40 to 60% by weight of oleic acid monoglyceride, mixtures of ethoxylated oleyl alcohol and ethoxylated cetyl alcohol with a statistical degree of ethoxylation of approximately 2, and/or, in particular, sorbitan oleate. The emulsions according to the invention contain the emulsifiers in the oil phase in quantities of 0.1 to 30% by weight and preferably in quantities of 1 to 15% by weight, based on the emulsion as a whole.

The present invention also relates to a process for the production of emulsion polymers dissolved in water or swellable in water. The polymerization is carried out by the mechanism of inverse emulsion polymerization known per se in the presence of water-in-oil emulsifiers in a water-in-oil emulsion of which the liquid oil phase—showing limited miscibility with water—at least partly contains monoether compounds, the monoether compounds containing two identical or different at least $C_5$ hydrocarbon moieties linked by the ether oxygen. As in DE-B-10 89 173, the ethylenically unsaturated monomers already described are dissolved or dispersed in water and emulsified in the oil phase according to the invention, which at least partly contains the special monoether compounds, using the emulsifiers already described. The ratio of the aqueous monomer-containing phase to the oil phase containing monoether compounds may vary within wide limits. A ratio by weight of aqueous monomer-containing phase to oil phase containing monoether compound of 40:60 to 90:10 is preferred. The emulsion polymerization of the ethylenically unsaturated monomers to form an emulsion polymer soluble in water or swellable in water is initiated by addition of initiators forming free radicals. The peroxide compounds, persulfate compounds, and/or azo compounds known to the expert, such as azodiisobutyronitrile, benzoyl peroxide, lauroyl peroxide, and/or potassium persulfate may be added to the oil phase or to the aqueous phase—depending on their solubility—as the initiators forming free radicals, optionally together with additional redox components, such as iron(II) salts, derivatives of sulfurous acid, ascorbic acid, and/or sodium formaldehyde sulfoxylate hydrate. Small quantities of initiators, preferably in the range from 0.001 to 2% by weight and more preferably in the range from 0.002 to 0.2% by weight, based on the emulsion as a whole, are added to the oil phase or to the aqueous phase for emulsion polymerization. The monomer-containing aqueous phase is preferably added with stirring to the oil phase containing monoether compounds and emulsifiers. Depending on the character of the monomers used, the polymerization is optionally accelerated by heating of the reaction mixture. Polymerization temperatures in the range from 20° to 100° C. are preferred, polymerization temperatures in the range from 30° to 90° C. being particularly preferred. By the described process there are obtained emulsions in which the emulsion polymers have molecular weights at least as high as those in emulsions in which the oil phase consists solely of poorly degradable hydrocarbons of the toluene type and the like.

The water-in-oil emulsions according to the invention are inverted before use, i.e., by augmenting the inner aqueous phase containing emulsion polymers and applying suitable measures, a phase reversal occurs. The emulsion polymer dissolved or swollen in water is released very much more quickly in water than if the solid polymer were dissolved or swollen in water. At the same time, the previously outer oil phase becomes the new inner phase after inversion. After inversion, the oil phase containing monoether compounds is present in relatively small quantities emulsified in the form of small droplets in water. Accordingly, under the effect of the (atmospheric) oxygen dissolved in water, the oil phase containing monoether compounds comes directly into contact with (atmospheric) oxygen via the water phase so that aerobic degradation of the oil phase containing monoether compounds has to be discussed. The advantage of the emulsions according to the invention lies inter alia in the fact that the aerobic degradation of the special monoether compounds can begin after inversion. Above all, therefore, the emulsions according to the invention overall show very much better aerobic biodegradability than known emulsions containing such hydrocarbons as toluene and the like in the oil phase. Suitable inversion measures are described, for example, in DE-A-21 54 081. In the most convenient method, wetting agents are added to the water-in-oil emulsion according to the invention, optionally together with water. The wetting agent is preferably first added to part of the water before the emulsion according to the invention is added. More water may then optionally be added to increase the aqueous phase. In another embodiment, the wetting agent is directly added to the emulsion according to the invention, in which case the wetting agent is preferably dissolved or dispersed in the hydrophobic mixtures of the oil phase according to the invention and stirred into the emulsion. The actual inversion only takes place before use through the addition of water. In general, it does not matter whether water is added to the emulsion or whether the emulsion is added to water. The quantity of wetting agent added varies according to the type of wetting agent used and the described inversion. Far more than and far less than the equivalent quantities may be added. 0.01 to 50% by weight, preferably 0.5 to 20% by weight and, more preferably, 1 to 20% by weight wetting agent, based on emulsion polymer, is generally added for inversion. Hydrophilic water-soluble wetting agents which may be cationic, anionic or nonionic are best used. Quantities in the lower range mentioned are generally preferred for the inversion of emulsions which already contain the wetting agent in the emulsion. Examples of the above-mentioned types of wetting agents can be found in DE-A-21 54 08. Of these wetting agents, nonionic surfactants, such as ethoxylation products of nonyl phenol and/or of higher, saturated and/or unsaturated fatty alcohols containing 12 to 18 carbon atoms, such as the reaction products of oleyl alcohol with 2 to 20 ethylene oxide units, are particularly preferred.

Other suitable measures for inverting the emulsions according to the invention include, for example, the addition of certain electrolytes, pH displacement with acids of any type, application of electrical high-voltage fields and/or application of shear forces.

The present invention also relates to the use of the emulsions according to the invention inverted beforehand by the method described above. According to the invention, the inverted emulsions may be used for any applications where colloids and solids present in dispersion are to be combined into larger particles and quantitatively removed from the liquid dispersion phase. In addition, the inverted emulsions according to the invention may be used where water is to be removed from solid particles present in liquid (water). In general, the inverted water-in-oil emulsions of emulsion polymers dissolved in water or swellable in water based on polyacrylamides in a liquid oil phase showing limited miscibility with water and at least partly containing monoether compounds, the monoether compounds containing two identical or different at least $C_5$ and at most $C_{24}$ hydrocarbon moieties linked by the ether oxygen, may be used as thickeners and/or as flocculation aids and/or as sedimentation aids.

Inverted emulsions containing cationically modified poly(meth)acrylamides may be used as flocculation aids and/or as sedimentation aids, for example in the refining of naturally occurring water to process water, in the purification of phosphoric acid in the digestion of phosphates with sulfuric acid, in the clarification of ilmenite digestion solutions, in the production of soda, and in wastewater treatment and/or the dewatering of sludges. The role of the flocculants in the examples mentioned is described by J. Reuter (*Chemiker-Zeitung*, Vol. 98 (1974), No. 5, pages 222 to 227). The anionically modified poly(meth)acrylamides according to the invention may be used, for example, as flocculants in the conditioning of process water and wastewater in mining. As flocculation and/or sedimentation aids, the inverted emulsions according to the invention are used in heavily water-diluted form. Inverted emulsions containing at most 1% by weight and preferably at most 0.1% by weight of polymer, based on inverted emulsion, are preferably used. Inverted emulsions based on emulsion polymers of high molecular weight may be used in even greater dilution, preferably up to at most 0.05% by weight, based on inverted emulsion.

The inverted emulsions according to the invention may also be used for their thickening effect. For example, polymeric dispersions of adhesives or coating compositions and printing inks, paints and/or cosmetic preparations may be thickened with the inverted emulsions. Depending on the emulsion polymer present, a thickening effect can be obtained at acidic pH values, at alkaline pH values, or over the entire pH range. Emulsions containing free acid groups in the emulsion polymer may be adjusted to the desired viscosity value in very short times by addition of bases. Emulsions containing aminoalkyl esters of (meth)acrylic acid copolymerized with the emulsion polymer may be made correspondingly viscous by addition of various quantities of acid. A thickening effect independent of the pH value can be obtained in emulsions containing copolymerized units of quaternized alkyl esters of polymerizable carboxylic acids. Inverted emulsions according to the invention with emulsion polymers containing comonomers with only limited solubility in water, such as styrene, in copolymerized form also have a good thickening effect. The emulsions according to the invention arc best used as thickeners in such concentrations that 5 to 20% by weight polymer solutions are obtained. Even lower contents of emulsion polymers in the inverted emulsions according to the invention may be preferred for certain applications. For example, lower contents than 5% by weight, preferably in the range from 0.1 to 5% by weight, expressed as emulsion polymer and based on the final in-use solution, of emulsion polymers in the emulsions are preferred for thickening aqueous solutions of wallpaper pastes.

EXAMPLES

Example 1

102.9 g of di-n-octyl ether and 13.1 g of sorbitan monooleate (Span 80 ®; Atlas) were introduced into a 1 liter reactor equipped with a blade stiffer, reflux condenser, thermometer, cooling and heating system. After addition of a mixture of 92.0 g of acrylamide, 33.8 g of acrylic acid, 169 g of demineralized water, 36.9 g of 30% NaOH and 0.66 g of a 1% aqueous solution of ammonium peroxydisulfate, the mixture was stirred for 10 minutes at 1000 revolutions per minute ("r.p.m."). The stirring speed was then reduced to 500 r.p.m., the system was evacuated three times with a water jet pump and was subsequently purged with nitrogen. The reaction mixture was then heated to 35° C. After addition of 0.33 g of a 1% aqueous ascorbic acid solution, the stirring speed was increased to 1000 r.p.m. for 2 minutes. If necessary, steps were taken—by external cooling—to ensure that the internal temperature did not significantly exceed 50° C. After the generation of heat had abated, the mixture was left to react for 30 minutes at 75° C. After cooling to room temperature, a mixture of 17.3 g of di-n-octyl ether and 11.2 g of coconut oil alcohol containing 9 EO (Dehydol 100 ®; Henkel KGaA) was stirred into the reaction mixture at a speed of 500 to 100 r.p.m. Particulars of the degree of modification, the specific viscosity and the flocculation properties can be found in Table 1.

Example 2

135 g of di-n-decyl ether, 11.2 g of a mixture of oleyl and cetyl alcohol ethoxylated with 2 EO (Eumulgin 02 ®; Henkel KGaA) and 3.8 g of a mixture of glycerol monooleate and glycerol dioleate (Atmos 300 ®; Atlas) were initially introduced as in Example 1 and a mixture of 114 g of acrylamide, 51.6 g of dimethylaminoethyl methacrylate, 12 g of adipic acid, 203 g of demineralized water, 46 g of a 30% $H_2SO_4$ and 3.6 g of a 1% aqueous solution of tertiary butyl hydroperoxide was added. After stirring, heating, evacuation and purging with nitrogen as in Example 1, 4.7 g of a 1 % aqueous sodium formaldehyde sulfoxylate hydrate solution were added, after which the mixture was stirred and polymerized. The degree of modification of this non-self-inverting emulsion and its specific viscosity are shown in Table 1.

Example 3

As in Example 1, 141 g of di-n-octyl ether and 18 g of Span 80 were initially introduced and a mixture of 90 g of acrylamide, 205.3 g of demineralized water, 68.7 g of dimethylaminomethyl methacrylate, 71 g of a 30% sulfuric acid and 1.8 g of a 1% aqueous tertiary butyl hydroperoxide solution were added. The mixture was then stirred, heated, evacuated and purged with nitrogen as in Example 1. 2.4 g of a 1% aqueous sodium formaldehyde sulfoxylate hydrate solution were then added and the mixture was polymerized. After cooling to room temperature, a mixture of 23 g of di-n-octyl ether and 15 g of coconut oil alcohol containing 9 EO were stirred into the emulsion as in Example 1. The degree of modification of this self-inverting emulsion, its specific viscosities and its flocculation properties are shown in Table 1.

Example 4

As in Example 1, 141 g of di-n-octyl ether and 18 g of Span 80 ® were initially introduced and a mixture of 90 g of acrylamide, 68.7 g of dimethylaminoethyl methacrylate, 205.3 g of demineralized water, 71 g of a 30% $H_2SO_4$ and 1.8 g of a 1% aqueous ammonium peroxydisulfate solution was added. The mixture was then stirred, evacuated, purged with nitrogen and heated as in Example 1. After addition of 0.9 g of a 1% aqueous ascorbic acid solution, the mixture was polymerized as in Example 1. The degree of modification and the specific viscosity of these non-self-inverting solutions are shown in Table 1.

Example 5

As in Example 1, 112.8 g of di-n-octyl ether, 28.2 g of stearic acid isohexadecyl ester (Rilanit IHS ®; Henkel KGaA) and 18 g of Span 80 ® were initially introduced and a mixture of 90 g of acrylamide, 68.7 g of dimethylaminoethyl methacrylate, 205.3 g of demineralized water, 71 g of 30% sulfuric acid and 1.8 g of a 1% aqueous ammonium peroxydisulfate solution were added. The mixture was then stirred, evacuated, purged with nitrogen and heated as in Example 1. 0.9 g of a 1% aqueous ascorbic acid solution were then added and the mixture was polymerized as in Example 1. The degree of modification and the specific viscosity of this non-self-inverting emulsion are shown in Table 1.

Example 6

As in Example 1, 70.5 g of di-n-octyl ether, 70.5 g of isotridecyl carbonate and 18 g of Span 80 ® were initially introduced and a mixture of 126 g of acrylamide, 227 g of demineralized water, 41.2 g of dimethylaminoethyl methacrylate, 42.8 g of a 30% $H_2SO_4$ and 1.8 g of a 1% aqueous tertiary butyl hydroperoxide solution was added. After stirring, heating, evacuation and purging with nitrogen as in Example 1, 2.4 g of a 1% aqueous sodium formaldehyde sulfoxylate hydrate solution were added and the mixture was stirred and polymerized.

The degree of modification of this non-self-inverting emulsion, its specific viscosities and its flocculation properties are shown in Table 1.

Example 7

A water-in-oil emulsion was prepared in the same way as in Example 6, except that a mixture of 27.7 g of di-n-octyl ether and 18 g of Dehydol 100 ® (Henkel KGaA) was stirred into the emulsion after cooling to room temperature. The degree of modification of this self-inverting emulsion, its specific viscosities and its flocculation properties are set out in Table 1.

Comparison Example 1

An oil-in-water emulsion was prepared in the same way as in Example 5 with the sole difference that the oil phase used did not consist of a mixture of fatty acid esters and ethers, but of stearic acid isohexadecyl ester in a quantity of 141 g.

Comparison Example 2

An oil-in-water emulsion was prepared in the same way as described in Example 5, except that the mixture of fatty acid ester and ether was replaced by 141 g of a dicarboxylic acid ester in the form of di-2-ethylhexyl adipate (Vestinol OA ®; Hüls).

Determination of Specific Viscosity

A) 5 g of the self-inverting water-in-oil emulsions of Examples 1, 3 and 7 were added with stirring to 750 ml of demineralized water. The emulsions were stirred for 1 hour for homogenization. A 0.2% by weight polymer solution was obtained. The polymer solution was mixed with equivalent quantities by volume of a 2-normal aqueous sodium nitrate solution. The mixture was filtered through a No. 597 folded filter. The specific solution viscosity was then determined at 20° C. in an Ostwald KPG viscosimeter (Schott, identification color green, order No. 2450905).

B) In the case of the non-self-inverting water-in-oil polymer dispersions of Examples 2, 4, 5 and 6, quantities of 5 g of emulsion were added to 750 ml of a 0.4% by weight aqueous solution of coconut oil alcohol containing 9 EO thoroughly mixed with a magnetic stirrer. Homogenization, mixing, filtration and determination of the specific solution viscosity were carried out as described above.

Determination of the Flocculating Effect

C) W/o emulsions containing cationically modified emulsion polymers

The w/o emulsions of Examples 2, 3, 4, 5, 6 and 7 were diluted with water as described in A) to form a 0.2% by weight solution and an equally large quantity of water was added to the resulting solutions. 15 ml of this 1:1 mixture were added to 100 ml of digested sludge-fresh from a communal sewage treatment plant; dry residue 2 to 4% by weight. After repeated shaking, the mixture was filtered under suction through a No. 598 round filter (5 minutes). The filter cake was weighed out immediately and was reweighed out after drying for 16 hours at 105° C. The dry matter content (DM) of the filter cake was determined. The level of the DM content (%) is used as a measure of the dewatering effect. Commercially available flocculating agents and their flocculation properties are shown for comparison in Table 1.

B) Anionically modified polymers 6.8 g of sodium chloride and 6 g of powdered activated carbon were introduced into 1 liter of demineralized water and stirred for 1 h with a blade stirrer. 500 ml of the activated carbon suspension thus prepared were introduced into a turbidity measuring vessel. 0.25 ml of a 1:1 mixture of 0.2% by weight polymer solution with water was then added with stirring at 500 r.p.m., followed by stirring for 2 minutes. After the stirrer had been switched off, the turbidity trend in the lower part of the vessel was measured for 5 minutes. The percentage ratio of residual turbidity to initial turbidity is the measure of the flocculating effect. A commercially available anionically modified flocculating agent is included in Table 1 for comparison.

TABLE 1

| Example | Modification | Degree of modification % | Specific viscosity | DM content (in %) |
| --- | --- | --- | --- | --- |
| 1 | Anionic | 30 | 2.42 | 8.2 |
| 2 | Cationic | 36 | 0.63 | Not determined |
| 3 | Cationic | 50 | 1.44 | 12.1 |
| 4 | Cationic | 50 | 1.26 | Not determined |
| 5 | Cationic | 50 | 1.03 | Not determined |
| 6 | Cationic | 30 | 1.64 | 13.3 |
| 7 | Cationic | 30 | 1.40 | 11.0 |
| Comp. 1 | Cationic | 50 | Mixture gels | Cannot be determined |
| Comp. 2 | Cationic | 50 | Mixture gels | Cannot be determined |
| P3-ferrocryl 8723 ®, Henkel, acrylamide containing 35–42% by weight of acrylic acid | Anionic | 35–42 | 1.48 | 7.0 |
| P3-ferrocryl 8766 ®, Henkel, acrylamide containing 50% by weight of dimethylaminoethyl methacrylate | Cationic | 50 | 0.96 | 13.5 |

The invention claimed is:

1. Water-in-oil emulsions comprising emulsion polymers that are dissolved in water, swellable in water, or both dissolved in and swellable in water in the presence of water-in-oil emulsifiers, in a liquid oil phase that contains below 0.3% by weight of dissolved water and contains monoether compounds, the monoether compounds containing two at least $C_5$ hydrocarbon moieties linked by the ether oxygen, the hydrocarbon moieties of the monoether compounds optionally being substituted by inert groups.

2. Emulsions as claimed in claim 1, wherein the oil phase contains monoether compounds having hydrocarbon moieties with from 5 to 18 carbon atoms.

3. Emulsions as claimed in claim 2, wherein the oil phase contains monoether compounds having $C_{6-14}$ hydrocarbon moieties.

4. Emulsions as claimed in claim 3, wherein the oil phase contains monoether compounds having $C_{7-12}$ hydrocarbon moieties.

5. Emulsions as claimed in claim 4, wherein the oil phase contains monoether compounds having unbranched aliphatic $C_{8-10}$ hydrocarbon moieties.

6. Emulsions as claimed in claim 5, wherein, in the oil phase, at least 50% by weight of all the monether compounds are monether compounds bearing aliphatic unbranched $C_{6-14}$ hydrocarbon moieties.

7. Emulsions as claimed in claim 6, wherein the oil phase contains monoether compounds in quantities of more than 45% by weight, based on oil phase.

8. Emulsions as claimed in claim 1, wherein the oil phase contains, in admixture with the monoether compounds, other organic components that are infinitely miscible with the monoether compounds, the other organic components being selected from the group consisting of hydrocarbons, fats, oils, fatty acid monoesters, carbonic acid diesters and dicarboxylic acid esters.

9. A process for the production of water-in-oil emulsions of emulsion polymers dissolved in water or swellable in water, wherein a polymerization is carried out, to produce the emulsion polymers dissolved in water or swellable in water, in the presence of water-in-oil emulsifiers in a water-in-oil emulsion of which the liquid oil phase contains below 0.3% by weight of dissolved water and comprises monoether compounds, the monoether compounds containing two at least $C_5$ hydrocarbon moieties linked by the ether oxygen.

10. Emulsions as claimed in claim 4, wherein, in the oil phase, at least 50% by weight of all the monoether compounds are monoether compounds bearing aliphatic unbranched $C_{6-14}$ hydrocarbon moieties.

11. Emulsions as claimed in claim 3, wherein, in the oil phase, at least 50% by weight of all the monoether compounds are monoether compounds bearing aliphatic unbranched $C_{6-14}$ hydrocarbon moieties.

12. Emulsions as claimed in claim 2, wherein, in the oil phase, at least 50% by weight of all the monoether compounds are monoether compounds bearing aliphatic unbranched $C_{6-14}$ hydrocarbon moieties.

13. Emulsions as claimed in claim 1, wherein, in the oil phase, at least 30% by weight of all the monoether compounds are monoether compounds bearing aliphatic unbranched $C_{6-14}$ hydrocarbon moieties.

14. Emulsions as claimed in claim 11, wherein the oil phase contains monoether compounds that contain two at least $C_5$ hydrocarbon moieties linked by the ether oxygen in quantities of more than 45% by weight, based on oil phase.

15. Emulsions as claimed in claim 10, wherein the oil phase contains monoether compounds that contain two at least $C_5$ hydrocarbon moieties linked by the ether oxygen in quantities of more than 45% by weight, based on oil phase.

16. Emulsions as claimed in claim 5, wherein the oil phase contains monoether compounds that contain two at least $C_5$ hydrocarbon moieties linked by the ether oxygen in quantities of more than 45% by weight, based on oil phase.

17. Emulsions as claimed in claim 4, wherein the oil phase contains monoether compounds that contain two at least $C_5$ hydrocarbon moieties linked by the ether oxygen in quantities of more than 45% by weight, based on oil phase.

18. Emulsions as claimed in claim 3, wherein the oil phase contains monoether compounds that contain two at least $C_5$ hydrocarbon moieties linked by the ether oxygen in quantities of more than 45% by weight, based on oil phase.

19. Emulsions as claimed in claim 2, wherein the oil phase contains monoether compounds that contain two at least $C_5$ hydrocarbon moieties linked by the ether oxygen in quantities of more than 30% by weight, based on oil phase.

20. Emulsions as claimed in claim 2, wherein the oil phase contains monoether compounds that contain two at least $C_5$ hydrocarbon moieties linked by the ether oxygen in quantities of more than 10% by weight, based on oil phase.

* * * * *